M. E. FRANCISCO.
ADJUSTABLE WINDSHIELD MIRROR.
APPLICATION FILED OCT. 4, 1919.
1,345,157.
Patented June 29, 1920.
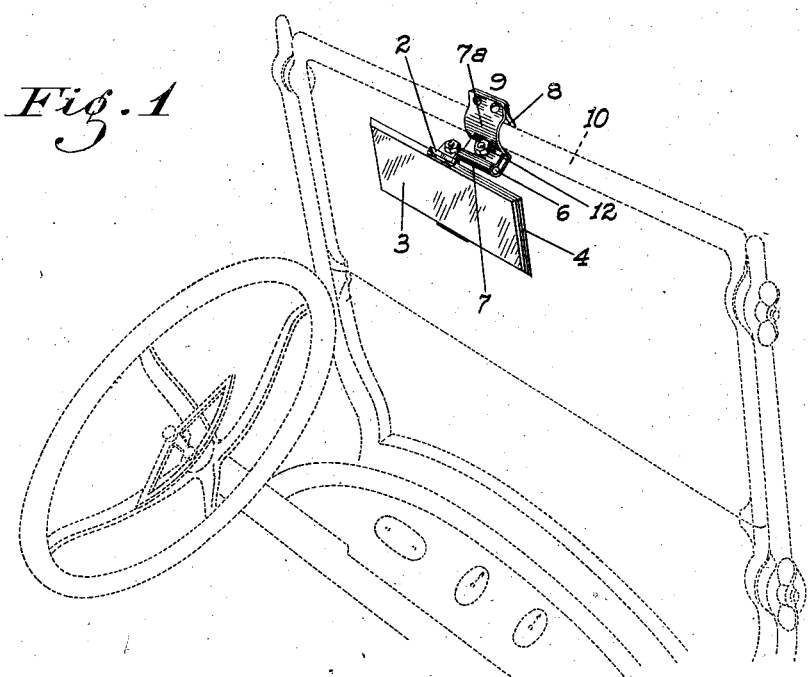
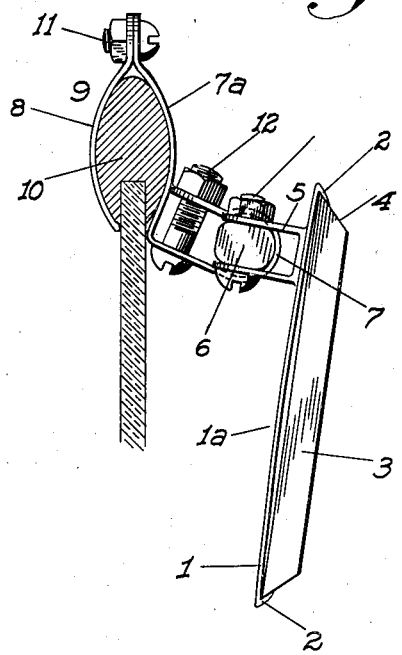
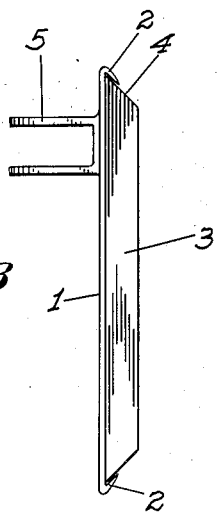
INVENTOR.
Marshall E. Francisco
BY
ATTORNEY

UNITED STATES PATENT OFFICE.

MARSHALL E. FRANCISCO, OF FRESNO, CALIFORNIA, ASSIGNOR OF ONE-HALF TO MOUNT K. WILD, OF FRESNO, CALIFORNIA.

ADJUSTABLE WINDSHIELD-MIRROR.

1,345,157.  Specification of Letters Patent.  Patented June 29, 1920.

Application filed October 4, 1919. Serial No. 328,541.

*To all whom it may concern:*

Be it known that I, MARSHALL E. FRANCISCO, a citizen of the United States, residing at Fresno, county of Fresno, State of California, have invented certain new and useful Improvements in Adjustable Windshield-Mirrors; and I do declare the following to be a full, clear, and exact description of the same, reference being had to the accompanying drawings, and to the characters of reference marked thereon, which form a part of this application.

This invention relates to improvements in adjustable windshield mirrors for use on automobiles, of that type adapted to enable the driver of the car to clearly see the road and vehicle behind and to one side of him.

The principal object of the invention is to produce a neat and compact device, so constructed that the mirror may be positioned at any desired angle relative to the windshield, and with the mirror so firmly yet removably held that there will be no rattling or vibration of the same, and no overhanging metal to partially cover the face of the mirror.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claim.

In the drawings similar characters of reference indicate corresponding parts in the several views.

Figure 1 is a perspective outline of the windshield of a motor vehicle and the parts adjacent thereto, showing my improved mirror in position thereon.

Fig. 2 is an enlarged end elevation of the mirror, showing the same mounted to the windshield frame.

Fig. 3 is a detached view of the mirror clamp, showing the method of securing the mirror thereto.

Referring now more particularly to the characters of reference on the drawings the numeral 1 denotes a substantially narrow spring steel plate, having inwardly angled flanges 2 along its top and bottom edges. A rectangular mirror is adapted to be held by these flanges, the mirror being of plate glass with the usual beveled edges 4 thereon, to the slope of which bevel the flanges 2 conform.

The plate 1 normally curves convexly relative to the mirror as shown at $1^a$ in Fig. 2, in which position the flanges 2 firmly grip the beveled edges of the mirror.

In order to position the mirror therefore, the plate 1 is straightened and so held, as depicted in Fig. 3, the actual distance between the flanges being then of course the greatest, and the mirror is then slipped endwise between the flanges. On releasing the plate, the same being of spring steel as previously stated, it regains its normal curvature, and the mirror is firmly pinched between said flanges.

Vertically spaced lugs 5 project from the back of the plate 1 near the top thereof, between which lugs is a rod or shaft 6 pivotally mounted thereto.

A sleeve 7 wraps partially around the rod 6 to one side of the lugs 5, such sleeve being bent upwardly beyond the rod to the rear of the mirror as at $7^a$ forming with a similar but oppositely shaped member 8 a clamp 9 adapted to straddle the frame 10 of the windshield of the car, this clamp being caused to grip the same by means of bolts 11.

The sleeve 7 is caused to grip the rod 6 with varying degrees of pressure by a bolt 12 passing through the spaced and straight portions of the sleeve beyond the plane of the rod 6.

It will therefore be evident that by means of this construction the mirror may be angled in two directions relative to the windshield, that is, transverse and vertical angles relative to the windshield.

Also I have provided a means for holding the mirror itself without the use of screws or surrounding the same by a frame, so that not only will it be securely held, but it may be instantly replaced in the event of its breaking, without the necessity of installing an entirely new device.

To attach the device to a closed car it is only necessary to eliminate the member 8 of the bracket 9, flatten the member $7^a$, and provide the latter with suitable holes for wood screws, so that it may be screwed to the wooden bar that goes across the front of the built-in windshield of the car.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

In combination with a clamp adapted to be adjustably secured to a windshield, a spring plate secured to the clamp, inwardly angled flanges on two opposed edges of the plate, and a bevel-edged and relatively long rectangular mirror adapted to be held and gripped between the flanges, the plate being normally convexly curved relative to the mirror, whereby to position the latter the plate must be temporarily straightened to allow the mirror to slide between the flanges.

In testimony whereof I affix my signature in presence of two witnesses.

MARSHALL E. FRANCISCO.

Witnesses:
MARIE JORGENSEN,
MARIAN NELSON.